INVENTOR
CHARLES W. WARREN
BY
Robertson, Smythe & Bryan
ATTORNEYS

FIG. IB

INVENTOR
CHARLES W. WARREN
BY
Robertson Smythe & Bryan
ATTORNEYS

Dec. 3, 1968   C. W. WARREN   3,414,729
PHASE NULL SPECTROPHOTOMETER
Filed Sept. 22, 1964   5 Sheets-Sheet 4

INVENTOR
*Charles W. Warren*
BY
*Robertson Smythe & Bryan*
ATTORNEYS

Dec. 3, 1968  C. W. WARREN  3,414,729
PHASE NULL SPECTROPHOTOMETER
Filed Sept. 22, 1964  5 Sheets-Sheet 5

INVENTOR
CHARLES W. WARREN
BY
Robertson Smythe & Bryan
ATTORNEYS

United States Patent Office 3,414,729
Patented Dec. 3, 1968

3,414,729
PHASE NULL SPECTROPHOTOMETER
Charles W. Warren, Weston, Conn., assignor to Instruments and Communications, Inc., Wilton, Conn., a corporation of Connecticut
Filed Sept. 22, 1964, Ser. No. 398,255
17 Claims. (Cl. 250—214)

ABSTRACT OF THE DISCLOSURE

A spectrophotometer arrangement employing reference and sample beam signals chopped (alternated) at a particular phase angle and recombined by a detector; synthesized reference and sample signals synchronously generated by the chopping means and having the same relative phase separation as the beam signals; the recombining of the synthesized reference and sample signals in a ratio to provide the same phase angle as the said combined beam signal; the use of the ratio of the synthesized signals as an accurate determination of the ratio of the beam signals.

---

This invention relates to spectrophotometers and particularly to one using an electronic null system for measuring transmittance or absorbance values.

In prior devices, optical null systems have been used, but these frequently included linearity problems, dead zones, and difficulty in approaching zero. Further, optical systems may be mechanically complicated because of the use of optical attenuator servos, moving optical parts, and electro-mechanical contacts. In prior phase shift systems, D.C. output has been used but such will always include a small error.

One of the objects of the present invention is to provide an improved electrically operated spectrophotometer which is not dependent upon an optical mechanical servo-loop.

Another of the objects of the invention is to provide a system wherein no moving optical elements are used.

A still further object of the invention is to provide a system which is optically symmetrical.

Another object of the invention is to provide an arrangement wherein the ratio of the two beams is measured without system error.

The invention is especially applicable to a two beam spectrophotometer for the purpose of determining the condition or element content of a sample.

In one aspect of the invention, a source of radiant energy provides two beams, one of which passes through the sample and the other through the reference. These can be termed the optical beams or the optical channel. Before passing through the sample and reference, a chopper chops the light in the beams so that they will be out of phase. The chopper can be in the form of rotating vanes. Preferably, the angle between the vanes should be 90° or less, but the invention will work when it is greater than 90°.

A duplicate pair of synthesized channel signals also are produced. Such can be provided by connecting the chopper vane shaft to an electric generator producing two signals or pulses in the same phase relation as those of the optical channel. One of the electric signals can be termed the "synthesized sample" signal and the other the "synthesized reference" signal of the synthesized or electric signal channel. An attenuating means is placed in the synthetic sample channel so that it can be changed to bring the synthetic sample and reference signals into the same time ratio relation as the optical beam signals.

The optical channel signals from the beams are combined and passed through a conventional monochromator and directed onto an energy responsive means such as a thermocouple.

As explained hereafter, the ratio of the sample and reference signals represents the vector addition of the two signals. The point at which the combined signals passes through zero will move in time in accordance with the ratio of the signals. The combined beam signal is fed through a conventional band-pass filter in order to obtain a pure sinusoidal wave without noise. The zero crossing point, in both the optical and synthetic channels, is determined precisely by using a high-gain amplifier or "zero-crossing" amplifier which will cause the portion of the wave crossing at the zero axis to have a high slope. The waves are clipped and then passed through a "one-shot" multivibrator which will locate the front face of the waves accurately once a cycle.

A ramp function generator means can have a ramp capacitor charged exponentially. The signal from the combined optical beams is used through a solid state switching means cyclically to discharge the ramp capacitor to ground.

A storage capacitor also is connected to the ramp capacitor for a very short time each cycle by the signal from the synthesized channel. The difference between a predetermined setting for the storage capacitor and that existent thereon provides a signal to an integrator which will adjust the attenuator in the synthetic sample channel to obtain a null. The magnitude of the latter signal is indicated by suitable recording or indicating instruments which will give the desired sample information.

In one aspect, the synthetic channel sample signal is fed into a phase splitter which has the attenuating means in the split phases thereof. The split phases of the synthesized sample signal and synthesized reference signal are combined and then fed through a band-pass amplifier and a "one-shot" multivibrator as described for the optical channel.

The instrument of the present invention has been found to be relatively inexpensive to build and yet to be extremely accurate.

These and other objects, advantages, and features of the invention will become apparent from the following description and drawings which are merely exemplary.

Figure 1:
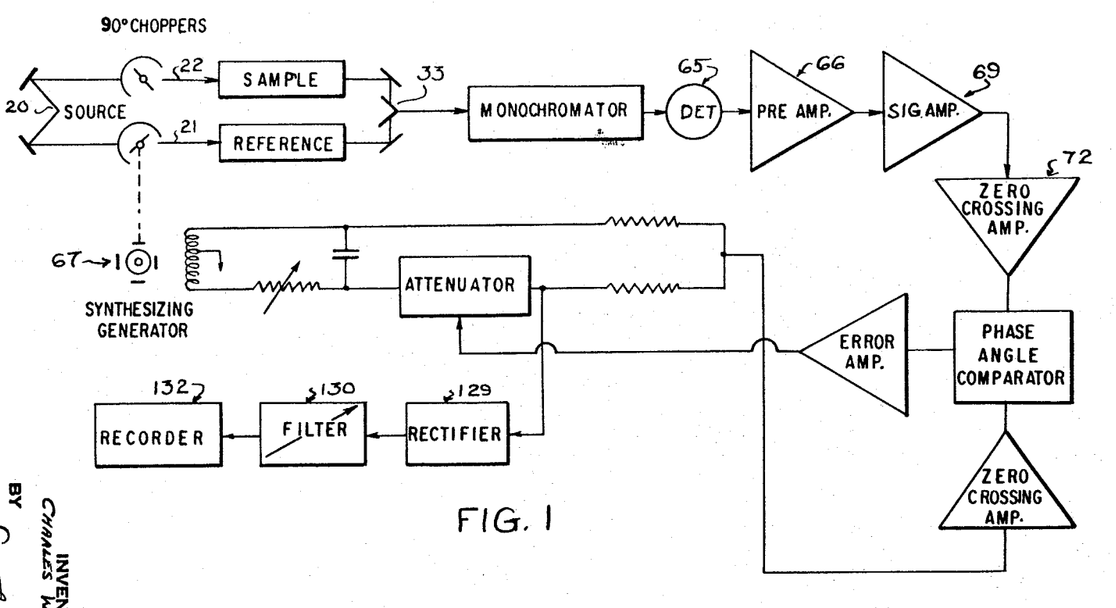
FIG. 1 is a block diagram.
Figures 4, 5, 6, 7, 8:
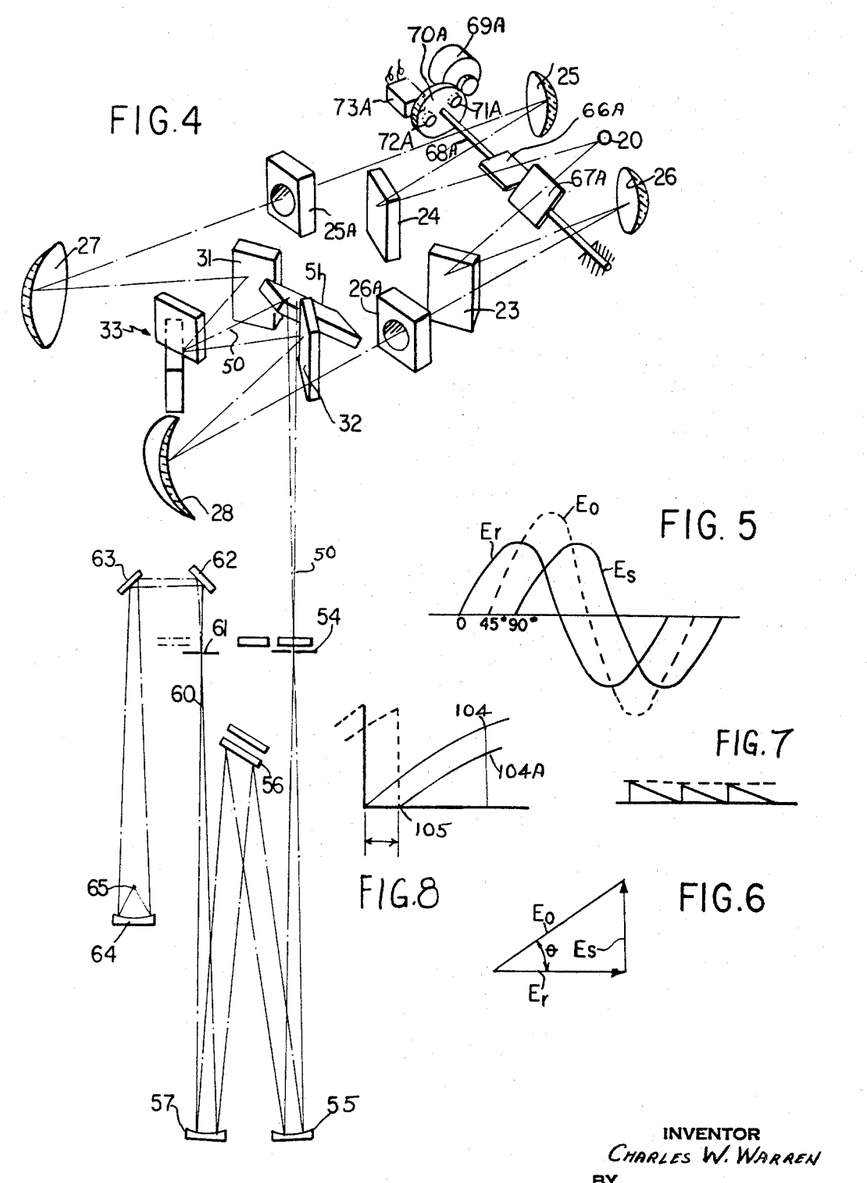
FIG. 4 is a schematic view, partially in perspective, of one arrangement of the optical system.
FIG. 5 diagrammatically shows the sinusoidal wave addition involved.
FIG. 6 is a representation of the vector addition performed by the invention.
FIG. 7 diagrammatically shows the "ripple" elimination used in conjunction with the "ramp" operation.
FIG. 8 diagrammatically shows the "ramp" circuit operation.

The invention will be described specifically in conjunction with a two-beam spectrophotometer, but the principles thereof can be used for other purposes. The block diagram of FIG. 1 has reference numerals, where appropriate, corresponding to the description of the other figures. Referring to FIGS. 5 and 6 for a general explanation of the principles involved in the invention, curve $E_r$ of FIG. 5 is sinusoidal and represents the voltage or signal of a reference source, and curve $E_s$ represents the sample signal. Curve $E_o$ represents the vector addition of $E_r$ and $E_s$. It can be seen that $E_s$ crosses the zero line at a point 90° from $E_r$. As will be explained hereafter, the two voltages or signals represented by $E_r$ and $E_s$ are those resulting from the optical signals which remain the same, but are chopped 90° out of phase by a chopper. As the sample varies in amplitude, the resultant sum of $E_r$ and $E_s$ will be the signal $E_o$ which will vary in phase from zero to 45° as $E_s$ varies from zero to 100 percent transmittance.

It is to be understood that angles other than 90° may be used if matched by the synthesizing channel to be explained later.

FIG. 6 depicts in vector form the addition of the $E_r$ and $E_s$ signals at 90°, the resultant vector $E_o$ being the square root of the sum of the squares. The angle $\theta$ will vary from zero to 45° as sample transmittance varies from zero to 100 percent.

Figures 2, 3:
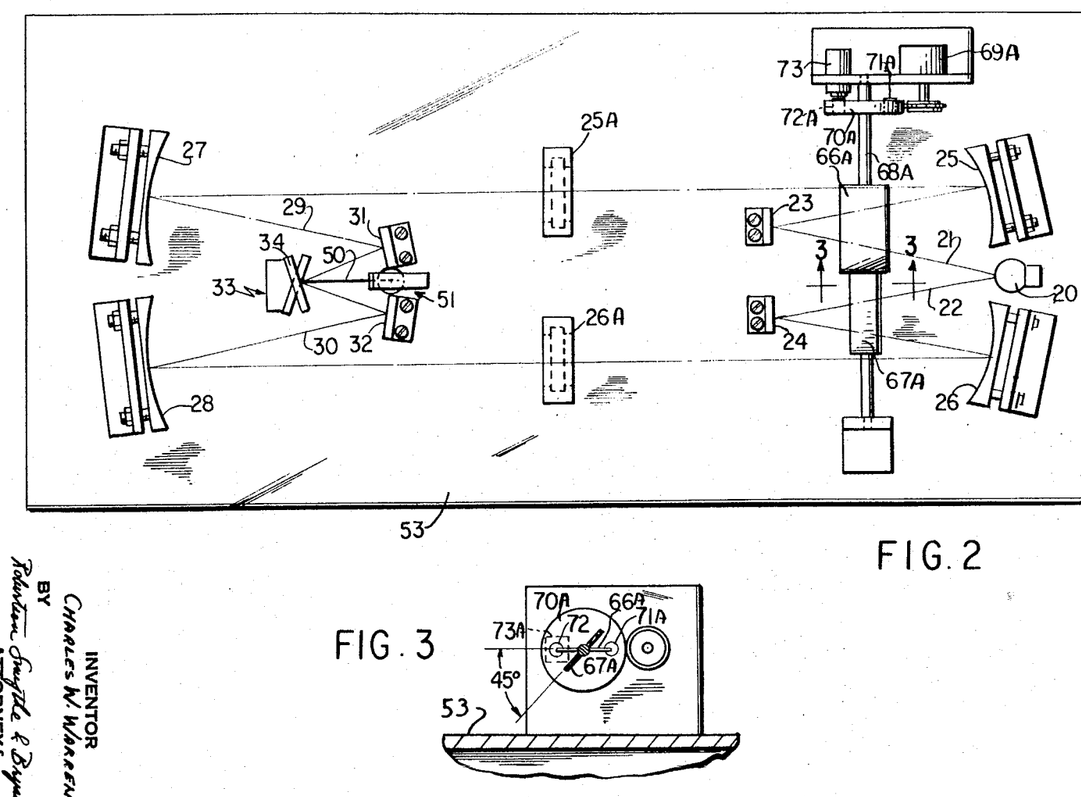
FIG. 2 is a simplified plan view of one form of apparatus that can be used.
FIG. 3 is a fragmentary sectional view looking in the direction 3—3 of FIG. 2.

First, one form of apparatus will be described which can be used to carry out the invention. Referring to FIG. 2, a source of radiant energy 20 is provided, which may be an infrared source of radiation, such as one sold under the trademark "Globar." It is to be understood, of course, that other forms of radiant energy can be used, for example, a heated filament tungsten lamp, carbon arc, or other forms.

The source of energy 20 provides two beams split into paths 21, 22 which are reflected from mirrors 23 and 24 to mirrors 25, 26. Mirrors 25, 26 focus the energy through reference compartment or area 25A and sample area 26A. After passing through the reference and sample, the beam strikes focusing mirrors 27 and 28 which focus the beams 29 and 30 onto reflecting mirrors 31 and 32 which then direct the beams onto a conventional beam combining pair of mirrors shown generally at 33.

From the beam combining mirror beams 33, the combined beam 50 is directed downwardly by inclined mirror 51. The combined beam is focused onto the entrance slit of a conventional monochromator which may be located vertically below the base 53 of the instrument. The combined beam will pass through slit 54 (FIG. 4) onto the mirror 55, then to the grating 56 and then to mirror 57, as is well known in the art. The beams 60 then pass through the exit slit 61 onto reflecting mirrors 62, 63 which direct it onto the focusing ellipsoid mirror 64 and then to detector 65. Detector 65 can be a thermocouple or other well-known type of energy-converting instrument.

The chopper, as shown in FIGS. 2 and 3, may comprise two vanes 66A, 67A mounted on shaft 68A driven by motor 69A. The vanes 66A and 67A are arranged to chop or periodically interrupt the beams so that they will be 90°, or other suitable angle, electrically out of phase. The motor 69A drives wheel 70A which has thereon two permanent magnets 71A, 72A which affect a pick-up coil 73A to form a synthesizing generator, such being shown generally at 67 (FIG. 1B. Operation of the synthesizing generator and synthesizing channel will be described later.

Figure 1A:
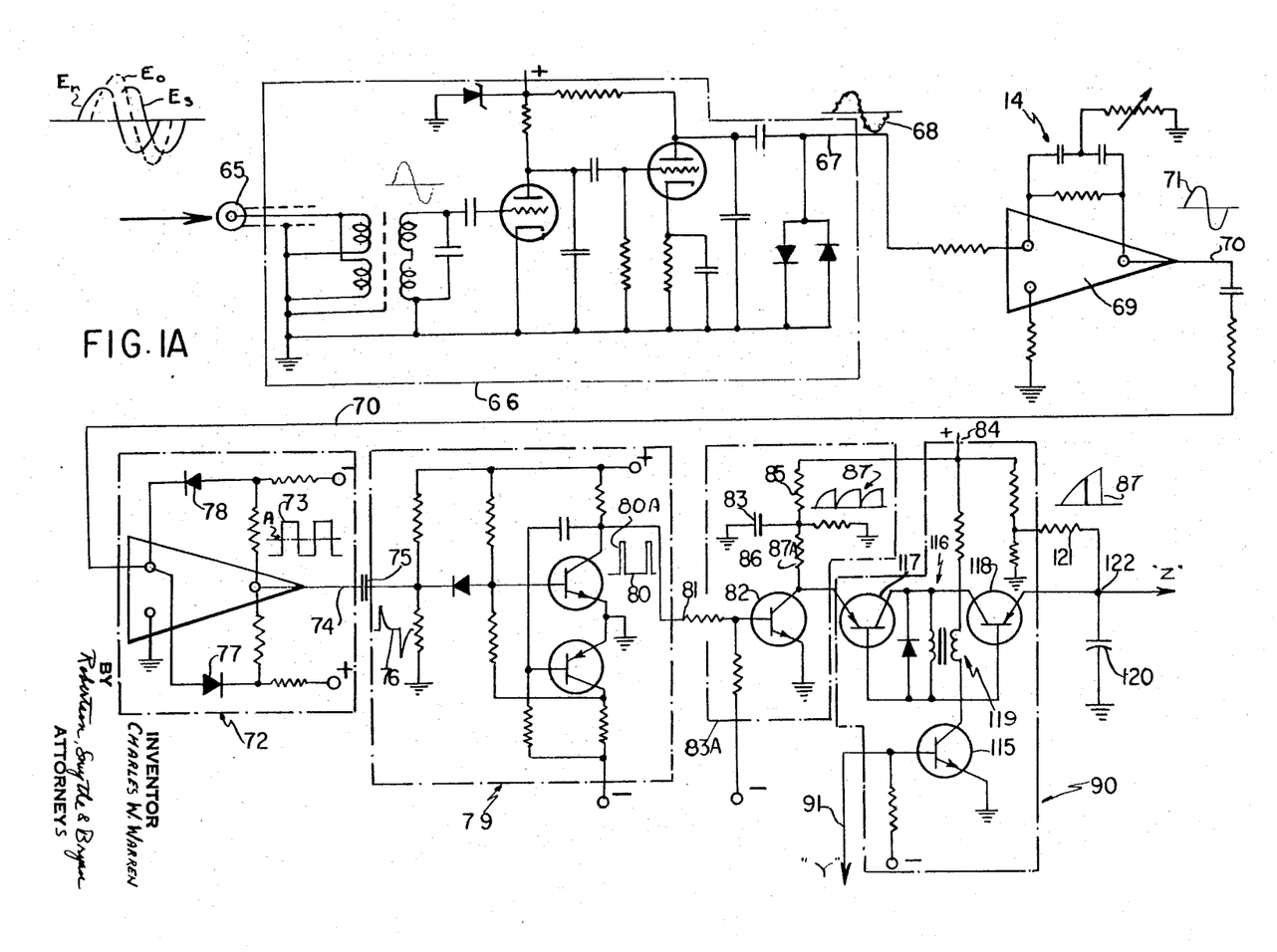
FIG. 1A and FIG. 1B show one form of circuit which can be employed to carry out the invention.

The combined beam passing through slit 61 is directed onto detector or thermocouple 65 (FIGS. 1A, 4). The signal from thermocouple 65, which is the result of the combined reference and sample radiant beams, is chopped 90° out of phase, and, as previously mentioned, is added in the detector in accordance with the square root of the sum of the squares of $E_r$ and $E_s$.

If there is no sample present, the angle will be zero. If the sample equals the reference, the angle will be 45°. Thus, the addition performed by the thermocouple causes the resultant signal to move in time back and forth with an excursion of 45°.

A conventional preamplifier is indicated in box 66. At the output 67 thereof, the waveform will include the signal and noise as diagrammatically illustrated at 68. The signal from preamplifier 66 is fed to a conventional band-pass amplifier schematically shown at 69. The band-pass amplifier will filter out the noise and harmonics, the resultant output signal at 70 therefrom being diagrammatically shown at 71. The signal is a substantially pure sinusoidal wave as compared to the output of the preamplifier at 67 which has signal plus noise as seen in waveform 68.

The sinusoidal wave from band-pass amplifier 69 is fed through lead 70 to amplifier 72 which may be termed a "zero crossing amplifier." It is a high-gain amplifier wherein the crossing at zero is sharp and the tops of the waves are cut off by diodes 77 and 78 so as to provide a substantially square type wave as shown diagrammatically at 73. One of its purposes is to establish the point in time when a signal crosses the zero axis, such as at "A" as seen in wave 73.

The output signal in lead 74 is fed to a differentiator 75 which forms a wave as shown diagrammatically at 76, the signal being a pulse type form.

The circuit within box 79 is a conventional "one-shot" multivibrator, the purpose of which is to produce a finite and known period of the flat top of a pulse as in the waveform illustrated schematically at 80. As is known in the "one-shot" type of operation, the pulse occurs at a finite time and will not again turn on during that same cycle. It turns on at the leading edge 80A of the wave shown at 80.

The signal from the "one-shot" multivibrator is fed by lead 81 to the solid state switch arrangement 82 which is part of the ramp function generator 83A. Ramp function capacitor 83 is charged from source 84 in the circuit through resistor 85 to ground 86. The ramp capacitor 83 will charge exponentially as shown in the diagrammatic waveform 87. When the signal from 81 reaches switch 82, it will trigger the switch so that ramp capacitor 83 will be discharged to ground through resistor 87A. The purpose of resistor 87A is to serve as a current limiting means so as not to overload or destroy switch 82. Ramp sampling circuit 90 receives a signal from lead 91 from the synthesizing channel previously mentioned.

The synthesizing channel 67 (FIG. 1B) now will be described. Permanent magnets 71A, 72A (FIG. 4) provide signals as they pass coil 73A which are at the frequency of the chopping means. The circuit including coil 73A is tuned and filtered in order to give a pure sinusoidal wave. The signal is split into two 90-degree components passing respectively through capacitor 90A and resistor 91A and through resistor 92 and capacitor 93. The signals fed into leads 94, 95 will be seen to be 90° apart, matching the phase angle in the optical channel, the signal in lead 94 being designated as the reference signal and the signal in 95 as the sample signal. A reference signal is fed directly to a summation point 96. through buffer amplifier 97. The sample signal 95 is fed through buffer amplifier 98 to phase splitter 99 to provide two signals 180° apart to leads 100, 101. Photo responsive resistors 102, 103, when in balance, will provide a null at point 104.

As explained previously, when the sample and reference optical beams are equal, the "ramp," as shown at 87, will have a predetermined discharge point, such as at point 104 (FIG. 8). Then, as the ratio of sample and reference energy changes, the point in time where the ramp starts, such as at 105, will change accordingly. As a result, the amplitude of the signal, such as at 104A, will change.

The separation between the optical signal causing the ramp to go to zero voltage and the time at which the ramp is sampled is determined by the angle between the pair of vanes and the signal produced by the pair of magnets 71A, 72A.

Figure 1B:
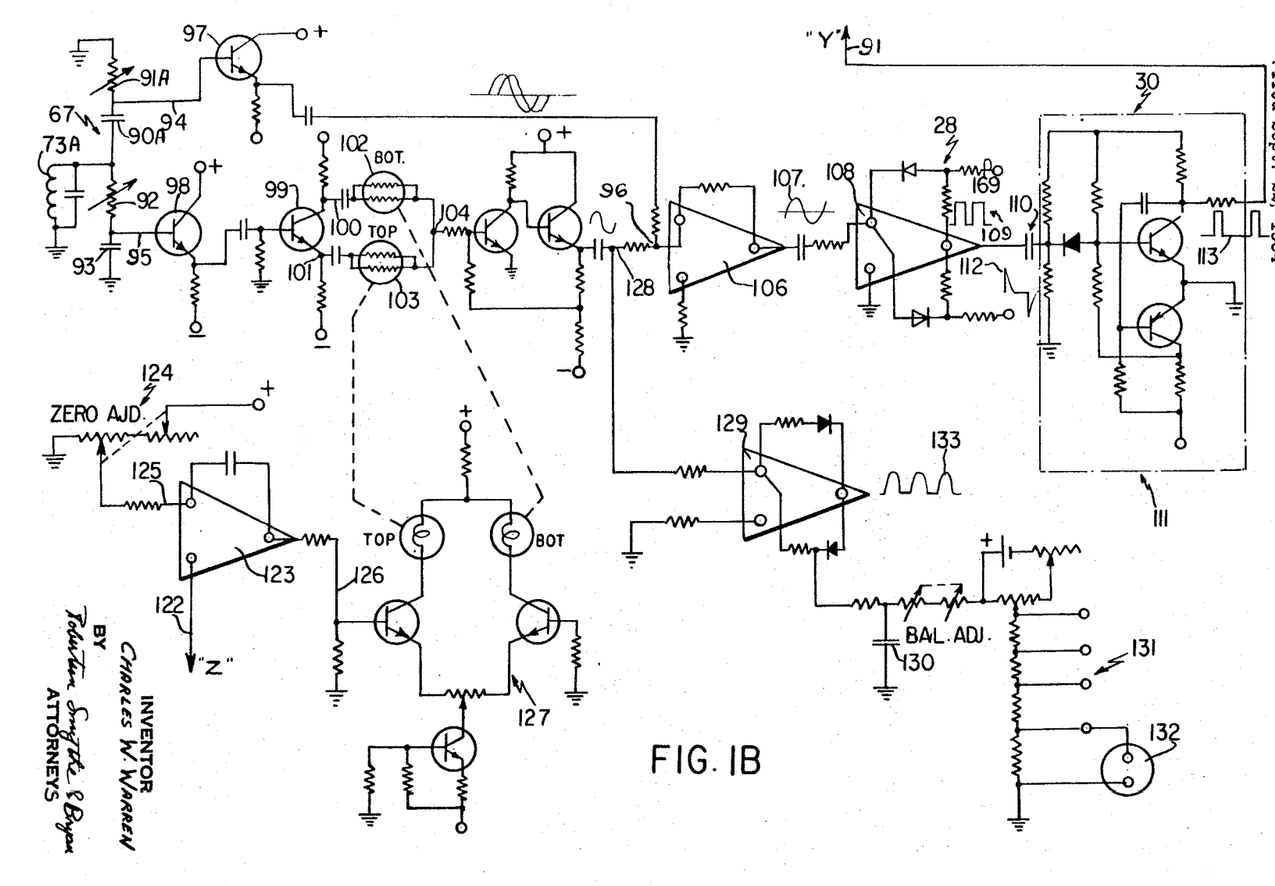

The circuitry in which the electrical signal is taken will now be described. The signal at point 96 is fed through the adder 106 which produces a sine wave, as shown at 107, whose phase angle is the resultant of the combination of the amount of sample and reference from the synthetic channel. This channel is made to have a zero-cross function through amplifier 108 in a manner similar to that described for zero-crossing amplifier 72 in the optical channel. Again, the square wave signal, shown diagrammatically at 109 is differentiated by capacitor 110, and the flat top wave is generated by "one-shot" multivibrator 111 similar to "one-shot" multivibrator 79.

The differentiated wave is depicted at 112 and the flat top wave at 113. This signal is fed through lead 91 to transistor switch 115 which samples the ramp through switching means 116 (FIG. 1A). Solid state switch 116 includes solid state members 117, 118 and the transformer and diode combination 119. The energy on the ramp capacitor 83 at the time the sample is taken is transferred to holding or storage capacitor 120. The pulse being fed in at 91 must be a fast pulse in relation to the chopping frequency so as to transfer energy quickly from the ramp capacitor to storage capacitor 120.

In view of the fact that some current will flow from the storage capacitor 120 into the input transistor of the integrator at 122, even when the ramp is sampled at the same point, a small ripple will develop. This is shown at FIG. 7. This small current may be supplied by a high value resistor 121 from a source of positive voltage. Normally a demodulator will have a heavy ripple wave from requiring heavy filtering circuits as compared with the present arrangement.

The voltage at point 122 is fed to differential integrator 123 (FIG. 1B). An equal voltage is fed in through a control means so as to obtain a zero adjustment network 124.

The amplified difference between the voltage at 122 and 125 is the error voltage. If there is no difference, then the system will be stationary or quiescent. If the ramp moves, there will be a difference and an output signal provided which moves in a direction to correct the unbalance in the system.

The correction for nulling is made by directing light onto photo-resistors 102 and 103. It is made through lead 126 and solid state lamp driver amplifier 127. The amount of the synthesized channel sample signal that is required at point 128 is in the same ratio to the synthesized reference signal as the sample is to the reference in the optical channel.

This amount or amplitude of signal is recorded through a conventional precision rectifier circuit 129 and is filtered at 130, attenuated at 131 and fed to a potentiometric recorder at 132. The half-wave signal is illustrated schematically at 133.

Thus, it can be seen that the system measures the ratio of the optical reference and optical sample signals by combining them according to the vector diagram that has been described. The combined signal moves the ramp signal back and forth in time through a 45° angle. The synthetic pair of signals, reference and sample, are made to duplicate the optical signals, and the ratio of the synthetic sample needed to balance the synthetic reference is the recorded value desired at the output.

Thus, the phase angle of the summed sample and reference signals in the optical channel is constantly compared with the phase angle of the summed synthetic sample and reference signals in the electrical channel, resulting in a true phase null system.

It should be apparent that variations may be made in the circuit and components without departing from the spirit of the invention except as defined in the appended claims.

What is claimed is:

1. The method of operating a spectrometer comprising the steps of providing a resultant signal by adding the signals from two out-of-phase beams, one beam having passed through the sample to be tested and the other having passed through a reference material, producing a synthesized pair of signals out-of-phase the same amount as said beams, one of said signals being a synthesized sample signal and the other a synthesized reference signal, and adding said synthesized signals in a proportion so that the ratio of the synthesized sample signal and synthesized reference signal is equal to the ratio of said out-of-phase beam signals.

2. The method of operating a spectrometer comprising the steps of providing a resultant signal by optically adding the optical signals from two out-of-phase beams, one optical beam having passed through the sample to be tested and the other having passed through a reference material, producing a synthesized pair of signals out-of-phase the same amount as said optical signals, one of said signals being a synthesized sample signal and the other a synthesized reference signal, and adding said synthesized pair of signals in a proportion so that the ratio of the synthesized sample signal and synthesized reference signal is equal to the ratio of said optical signals.

3. The method of operating a spectrometer comprising the steps of providing a resultant signal by adding the optical signals from two out-of-phase beams, one beam having passed through the sample to be tested and the other having passed through a reference material, producing a synthesized pair of signals out-of-phase the same amount as said optical signals, one of said signals being a synthesized sample signal and the other a synthesized reference signal, and adding in time said synthesized pair of signals in a proportion so that the ratio of the synthesized sample signal and synthesized reference signal is equal to the ratio of said optical signals.

4. The method of operating a spectrometer comprising the steps of providing a resultant signal by optically adding the signals from two out-of-phase optical beams, one optical beam having passed through the sample to be tested and the other having passed through a reference material, producing a synthesized pair of signals out-of-phase the same amount as said optical signals, one of said signals being a synthesized sample signal and the other a synthesized reference signal, and adding in time said synthesized pair of signals in a proportion so that the ratio of the synthesized sample signal and synthesized reference signal is equal to the ratio of said optical signals.

5. The method of operating a spectrometer comprising the steps of providing a resultant signal by optically adding in time the optical signals from two out-of-phase beams, one optical beam having passed through the sample to be tested and the other having passed through a reference material, producing a synthesized pair of signals out-of-phase the same amount as said optical signals, one of said signals being a synthesized sample signal and the other a synthesized reference signal, and adding in time said synthesized pair of signals in a proportion so that the ratio of the synthesized sample signal and synthesized reference signal is equal to the ratio of said optical signals.

6. The method of operating a spectrometer comprising the steps of providing a resultant signal by optically adding in time the optical signals from two out-of-phase beams, one optical beam having passed through the sample to be tested and the other having passed through a reference material, producing a synthesized pair of signals out-of-phase the same amount as said optical signals, one of said signals being a synthesized sample signal and the other a synthesized reference signal, comparing the phase angle of the added in time optical beams and the added in time synthesized signals, changing the ratio of the synthesized sample signal and synthesized reference signal so that said synthesized sample signal and synthesized reference signal are in the same ratio as said optical signals, and providing an indication of the attenuation needed to bring the phase difference between said added optical and synthesized signals to a null so as to determine the transmittance of the sample.

7. The method of operating a spectrometer having a source of radiant energy, comprising the steps of providing a resultant optical signal by adding optically the optical signals from two out-of-phase beams, one beam having passed through the sample to be tested and the other having passed through a reference material, converting said resultant optical signal to an electrical signal, detecting the zero-crossing of said electrical signal, producing a synthesized pair of electrical signals out-of-phase the same amount as said optical signals, one of said signals being a synthesized sample signal and the other a synthesized reference signal, detecting the zero-crossing of the resultant signal of said synthesized sample signal and said synthesized reference signal, determining the delay between zero-crossings, changing the zero-crossing of the resultant synthesized signal relative to the zero-crossing of the optical signal to maintain the delay constant by attenuating said synthesized signals relative to each other so that the ratio of the synthesized pair of signals is the same as the ratio of the optical signals.

8. In a spectrometer, the combination including a source of radiant energy, means forming two optical beams, means chopping said beams so that they are out of phase, means passing one of said beams through the sample to be tested and the other through reference material to provide optical signals, means summing the energy of said beams and providing a summation signal having a phase angle corresponding to the ratio of amplitudes of said beams, means connected with said means chopping said beams to provide two synthesized electrical signals out-of-phase the same amount as said beams after being chopped, circuit means adjusting the ratio of said two electrical signals to be the same as the ratio of said beams, and indicating means responsive to the condition of said circuit means for providing an indication of the sample signal amplitude as compared to the reference signal amplitude.

9. In a spectrometer, the combination including a source of radiant energy, means forming two optical beams, means chopping said beams so that they are out of phase, means passing one of said beams through the sample to be tested and the other through reference material so as to provide optical beam signals, means summing the energy of said beam signals and providing an optical channel summation signal, means applying said summation signal to a zero-crossing amplifier to provide a steep slope at the zero cross point, a ramp function generating circuit connected to said zero-crossing amplifier to provide a phase angle signal corresponding to the ratio of amplitudes of said beam signals, means connected with said means chopping said beams to provide two synthesized electrical signals out-of-phate the same amount as said beams after being chopped, circuit means adjusting the ratio of amplitudes of said two electrical signals to be the same as the ratio of amplitudes of said beam signals, and indicating means responsive to the condition of said circuit means for providing an indication of the sample signal amplitude as compared to the reference signal amplitude.

10. In a spectrometer, the combination including a source of radiant energy, means forming two optical beams, means chopping said beams so that they are out of phase, means passing one of said beams through the sample to be tested and the other through reference material so as to provide optical beam signals, means summing the energy of said beam signals and providing an optical channel summation signal, means applying said summation signal to a zero-crossing amplifier to provide a steep slope at the zero cross point, a ramp function generating circuit connected to said zero-crossing amplifier to provide a phase angle signal corresponding to the ratio of amplitudes of said beam signals, electric generator means connected with said means chopping said beams to provide two synthesized electrical signals out-of-phase the same amount as said beams after being chopped, circuit means adjusting the ratio of amplitudes of said two electrical signals to be the same as the ratio of amplitudes of said beam signals, and indicating means responsive to the condition of said circuit means for providing an indication of the sample signal amplitude as compared to the reference signal amplitude.

11. In a spectrometer, the combination including a source of radiant energy, means forming two optical beams, means chopping said beams so that they are out of phase not more than 90°, means passing one of said beams through the sample to be tested and the other through reference material so as to provide optical beam signals, means summing the energy of said beam signals and providing a summation signal having a phase angle proportional to the ratio of amplitudes of said beam signals, means connected with said means chopping said beams to provide two synthesized electrical signals out-of-phase the same amount as said beams after being chopped, circuit means adjusting the ratio of the synthesized sample signal to the synthesized reference signal to provide a summation signal with the same phase angle as the beam summation signals, and indicating means responsive to the amplitude of the synthesized sample signal.

12. In a spectrometer, the combination including a source of radiant energy, means forming two optical beams, means chopping said beams so that they are out of phase not more than 90°, means passing one of said beams through the sample to be tested and the other through reference material, means summing the energy of said beams and providing a summation signal having a phase angle in time corresponding to the ratio of amplitudes of said beams, means connected with said means chopping said beams to provide two synthesized electrical signals out-of-phase the same amount as said beams after being chopped, one of said signals being a synthesized sample signal and the other a synthesized reference signal, phase shift network means connected to said sample signal only providing two electrical signals 180° out-of-phase, circuit means for adjusting said 180° out-of-phase sample signals in accordance with an error signal produced by the difference between the phase angle of the optical channel signal and the phase angle of the synthesized channel signal, and indicating means responsive to the condition of said circuit means for providing an indication of the sample transmittance as compared to the reference.

13. A spectrometer in accordance with claim 12 wherein the means to adjust said out-of-phase signals is a photo attenuator.

14. In a spectrometer, the combination including a source of radiant energy, means forming two optical beams from said source, means chopping said beams so that they are out of phase, optical means passing one of said beams through the sample to be tested and the other through said reference material, beam combining means providing an optical channel signal, means feeding said optical channel signal to a zero-crossing high-gain amplifier providing an intime signal of the ratio of said beams, means for generating a ramp voltage, means connecting said zero-crossing amplifier to said means for generating a ramp voltage, a storage capacitor periodically connected with said means for generating a ramp voltage, means connected to said means chopping said optical beams to provide an electric synthesized sample signal and an electric synthesized reference signal, means for attenuating one of said synthesized signals relative to the other, means for summing the synthesized sample signal and the synthesized reference signal after attenuation, a second zero-crossing high-gain amplifier connected to said means summing said synthesized signals to provide an in time signal of the ratio of said synthesized signals, means connecting said second zero-crossing amplifier to said means for generating a ramp voltage, means connecting said storage capacitor means to said means for attenuating said synthesized sample signals, so that said synthesized sample and reference signals will be in the same ratio as said optical beams, and means responsive to the signal required to bring said synthesized signal to the same ratio for giving an indication of the amplitude of the sample signal.

15. In a spectrometer, the combination including a source of radiant energy, means forming two optical beams from said source, motor means chopping said beams so that they are out of phase, optical means passing one of said beams through the sample to be tested and the other through said reference material, beam combining means providing a single combined optical channel signal, monochromator means providing a monochromatic optical channel signal, means feeding said monochromatic optical channel signal through an optical to electrical transducer to a zero-crossing high-gain amplifier providing an intime signal whose phase angle varies with the ratio of said optical beams, means for generating a ramp voltage including a ramp capacitor connected to a voltage supply, means connecting said ramp capacitor to said zero-crossing amplifier, the signal from said zero-crossing amplifier discharging the ramp capacitor in accordance with the optical signal phase, electrical generator means connected to said motor means chopping said optical beams to provide an electric synthesized sample signal and an electric synthesized reference signal, means for attenuating said synthesized sample signal, means summing said synthesized sample signal and the synthesized reference signal after attenuation, a second zero-crossing high-gain amplifier connected to said means summing said synthesized signals to provide an intime signal whose phase angle varies with the ratio of said synthesized signals, for generating sampling pulses at time of zero-crossing of said second zero-crossing amplifier, a storage capacitor periodically connected with said means for generating the ramp voltage in accordance with the phase angle of the summed synthesized signal, means connecting said storage capacitor to said means for attenuating said synthesized sample signal, so that said synthesized sample and reference signals will be in the same ratio as said optical beams, and means rsponsive to the signal required to bring said synthesized signal to the same ratio for giving an indication of the amplitude of the sample signal.

16. In a spectrometer, the combination including a source of radiant energy, means forming two optical beams from said source, motor means chopping said beams so that they are out-of-phase, optical means passing one of said beams through the sample to be tested and the other through said reference material, beam combining means providing a single combined optical channel signal, monochromator means providing a monochromatic optical channel signal, means feeding said monochromatic optical channel signal through an optical to electrical transducer to a zero-crossing high-gain amplifier providing an in time signal whose phase angle varies with the ratio of said beams, means for generating a ramp voltage including a ramp capacitor connected to a voltage supply, means connecting said ramp capacitor to said zero-crossing amplifier, the signal from said zero-crossing amplifier discharging the ramp capacitor in accordance with the optical signal phase, electrical generator means connected to said motor means chopping said optical beams to provide an electric synthesized sample signal and an electric synthesized reference signal, phase splitting means in the synthesized sample signal channel, a photo attenuator connected to said synthesized sample signal means, means summing said synthesized sample and reference signals, a second zero-crossing high-gain amplifier means connected to said means summing said synthesized signals to provide an intime signal whose phase angle varies with the ratio of said synthesized signals, means for generating sampling pulses at time of zero-crossing of said second zero-crossing amplifier, a storage capacitor periodically connected with means for generating the ramp voltage in accordance with the phase angle of the summed synthesized signal, means connecting said storage capacitor to said photo attenuator, so that said synthesized sample signal and said synthesized reference signal will be the same ratio as said optical beams, and means responsive to the signal required to bring said synthesized signal to the same ratio for giving an indication of the sample amplitude signal.

17. In a spectrometer, the combination including a source of radiant energy, means forming two optical beams from said source, motor means chopping said beams so that they are out of phase not more than 90° optical means passing one of said beams through the sample to be tested and the other through said reference material, beam combining means providing a single combined optical channel signal, monochromator means providing a monochromatic optical channel signal through an optical to electrical transducer to a zero-crossing high-gain amplifier providing an intime signal whose phase angle varies with the ratio of said beams, means for generating a ramp voltage including a ramp capacitor connected to a voltage supply, means connecting said ramp capacitor to said zero-crossing amplifier, the signal from said zero-crossing amplifier discharging the ramp capacitor in accordance with the optical signal phase, electrical generator means connected to said motor means chopping said optical beams to provide an electric synthesized sample signal and an electric synthesized reference signal, phase splitting means in the synthesized sample signal channel, a photo attenuator connected to said synthesized sample signal means, means summing said synthesized sample and reference signals, a second zero-crossing high-gain amplifier means connected to said means summing said synthesized signals to provide an intime signal whose phase angle varies with the ratio of said synthesizer signals, means for generating sampling pulses at time of zero-crossing of second zero-crossing amplifier, a storage capacitor periodically connected with said means for generating the ramp voltage in accordance with the phase angle of the summed synthesized signal, means connecting said storage capacitor to said photo attenuator so that said synthesized sample and refernce signals will be in the same ratio as said optical beams, and means responsive to the signal required to bring said synthesized signal to the same ratio for giving an indication of the sample amplitude signal.

References Cited
UNITED STATES PATENTS

| | | | |
|---|---|---|---|
| 2,547,212 | 4/1951 | Jamison et al. | 250—204 X |
| 2,679,185 | 5/1954 | Alwood. | |
| 2,750,834 | 6/1965 | Golay. | |
| 2,892,948 | 6/1959 | Frantz | 250—202 |
| 2,946,953 | 7/1960 | Boscia. | |
| 3,009,107 | 11/1961 | Aspden et al. | |
| 3,218,914 | 11/1965 | Bartz et al. | |

RALPH G. NILSON, *Primary Examiner.*

T. N. GRIGSBY, *Assistant Examiner.*

UNITED STATES PATENT OFFICE
CERTIFICATE OF CORRECTION

Patent No. 3,414,729　　　　　　　　　　　　　　　December 3, 1968

Charles W. Warren

It is certified that error appears in the above identified patent and that said Letters Patent are hereby corrected as shown below:

Column 2, line 5, "signals" should read -- signal --; line 59, "operation." should read -- operation; --. Column 3, lines 29 and 30, "beam strikes" should read -- beams strike --; line 55, insert a closing parenthesis before the period. Column 7, line 45, "phate" should read -- phase --. Column 8, line 16, "signals" should read -- signal --. Column 9, line 26, before "for" insert -- means --; line 34, "rsponsive" should read -- responsive --. Column 10, line 4, before "means" insert -- said --; line 38, "synthesizer" should read -- synthesized --.

Signed and sealed this 31st day of March 1970.

(SEAL)
Attest:

Edward M. Fletcher, Jr.　　　　　　　　　　　　　WILLIAM E. SCHUYLER, JR.
Attesting Officer　　　　　　　　　　　　　　　　　　Commissioner of Patents